June 10, 1969     A. A. LAVINE     3,449,758

HIGH SPEED PHOTOGRAPHIC RECORDER

Filed Oct. 9, 1967

INVENTOR.
ARTHUR A. LAVINE
BY
Don Finkelstein
ATTORNEY

United States Patent Office 3,449,758
Patented June 10, 1969

3,449,758
HIGH SPEED PHOTOGRAPHIC RECORDER
Arthur A. Lavine, 319 Palos Verdes Blvd., Apt. 212,
Redondo Beach, Calif. 90277
Filed Oct. 9, 1967, Ser. No. 673,580
Int. Cl. G01d 9/42
U.S. Cl. 346—107                    7 Claims

ABSTRACT OF THE DISCLOSURE

There is described herein a photographic recording arrangement particularly adapted and suited extremely high speed operation. The high intensity highly monochromatic light from a pulsed laser is utilized to provide an output of electromagnetic radiation having a predetermined pulse duration. A pulse from the laser is directed into an optical delay line that provides a preselected path length for multiple reflections of the pulse in the optical delay line. At predetermined points within the optical delay line a portion of the pulse is reflected from the optical delay line and onto focusing mirrors which reflect the pulse portion sequentially onto the event to be photographed. By selecting the position of the points in the optical delay line where the pulse portion is reflected, different time delays and hence different time sequences may be selected at known intervals. The portions of the pulse are therefore sequentially directed by the focusing mirrors onto the event to be photographed and after being reflected from the event are sequentially and selectively recorded by a matching plurality of filtered, electronically, time sequence controlled receiving camera arrangements to provide a plurality of photographs of known exposure times and repetition times.

BACKGROUND OF THE INVENTION

Field of the invention

This invetnion relates to the photographic art and more particularly to the improved arrangement for providing high speed photographic recording of an event.

Description of the prior art

In many applications, for example, such as recording the sequence of occurrences during a high speed event such as an explosion, hypervelocity impact, the detonation of a shaped charge, and the like, it is also desired to provide a series of photographs of an event at extremely short expossure times and high repetition rates. For example, it may be desired to record a sequence of photographs of an event wherein the event itself has a total time duration on the order of 500 nanoseconds. Similarly, the exposure time of each photograph recording may be comparatively short, e.g., on the order of 5 nanoseconds. Certain arrangements utilized in the past for recording such high speed events have not always proven to be completely satisfactory. For example, in general, in one form of high speed photography, only self luminous events were capable of being recorded. Consequently, such events had to emit large amounts of electromagnetic radiation so that, at the very fast exposure times, the light intensity impinging on the photography recording film would be great enough to activate the film.

Other arrangements have utilized rotating mirrors to achieve a high repetition rate, but such arrangements are, of course, limited by mechanical considerations.

Similarly, high speed light sources, such as stroboscopic lights, utilized to illuminate the event were generally black body emitters and therefore it has been difficult to distinguish, on the photographs so made, between the stroboscopic light, background and self luminous events.

Summary of the invention

Accordingly, it is an object of applicant's invention herein to provide an improved high speed photographic recording arrangement.

It is yet another object of applicant's invention herein to provide a high speed photographic recording arrangement in which the event to be photographed may repetitively be photographed at extremely high repetition rates for extremely short exposure times.

It is yet another object of applicant's invention herein to provide a high speed photographic recording arrangement that may be comparatively easily calibrated and aligned with the event to be recorded.

The above and other objects are achieved, according to one embodiment of applicant's invention, by providing a source of high speed, pulsed, substantially monochromatic, electromagnetic radiation, such as that emitted by a pulsed laser. Such lasers generally have a pulse rate on the order of three pulses per second. Each pulse has a duration on the order of, for example, five nanoseconds. With such a laser it may be desired to photograph an event ten times within, for example, approximately 550 nanoseconds. Thus, it may be desired to have ten such photographs recording the event during a five nanosecond exposure time at 50 nanoseconds between each such recording for a total event photographic recording time of 550 nanoseconds.

One pulse from the laser may be directed into an optical delay line means. The optical delay line means comprises a pair of spaced apart parallel, dielectric mirror strips and the pulse enters the optical delay line through a transmitting aperture in one of the mirror strips and at a slight angle thereto so that the pulse is sequentially reflected back and forth between the two parallel dielectric mirror strips. By spacing the parallel dielectric mirror strips a predetermined distance apart, a preselected path length for the pulse as it makes sequential reflections from the mirrors may be obtained. For example, in order to achieve ten photographs at approximately 50 nanosecond intervals between such photographs, the dielectric mirrors may be spaced 1.2 meters apart and may be, for example, on the order of one meter long and one centimeter wide. The multiple reflection between the two mirrors results in a predetermined path width such that six two-way traverses allow for approximately a 48-nanosecond delay.

A plurality of pick-off mirrors are spaced a predetermined distance apart and are adapted to receive predetermined portions of the total energy in each pulse at predetermined positions along the delay line. By properly spacing the pick-off mirrors in the delay line, the same percentage of energy from each pulse is sequentially reflected by each pick-off mirror and is so reflected that each such reflected portion of the pulse leaves the path between the parallel dielectric mirrors and is reflected onto a focusing mirror. Since the pick-off mirrors are spaced apart, they receive the pulse at different times and therefore reflect sequentially the pulse portion onto their respective focusing mirrors at predetermined known time intervals.

The plurality of focusing mirrors sequentially direct the reflected portions of the pulse from each pick-off mirror onto the event to be photographed. For example, the delay time in the optical delay line for six two-way traversals is on the order of 48 nanoseconds between each pair of adjacent pick-off mirrors. Allowing approximately 2 nanoseconds between pick-off mirrors to allow for small path length variations due to surface irregularities in the mirrors and positioning variations, a total delay on the order of 50 nanoseconds between successive reflections of a portion of the pulse is achieved.

The pulse illuminates the event and is reflected onto the photographic recording structure.

The photographic recording structure has a filter that has a comparatively narrow-band width transmission and includes those wavelengths of the laser pulse. A photographic plate to record the interval, optics to direct the light from the event onto the filter and thus onto he photographic plate and a shutter control for sequentially opening and closing the shutter of the camera complete the basic photographic recording structure. For the above example, where ten successive photographs are required, ten such camera units are arranged to receive sequentially each successive portion of the pulse as it is reflected from the event.

The shutter control is synchronized with the generation of each pulse from the laser and conventional shutter delay sequencing arrangements may be utilized to provide operation of the shutters in the proper sequence. An electronic time delay may be utilized to provide operation of the shutters in the proper sequence. For example, a Pockel's cell shutter may be utilized to provide the fast opening and closing times desired which, for example, may require that the shutter be opened for 20 nanoseconds centered around the five-nanosecond pulse and at the 50-nanosecond intervals between successive reflections of each portion of the pulse onto the event and thus onto the photographic film.

BRIEF DESCRIPTION OF THE DRAWING

The above and other embodiments of applicant's invention may be more readily understood from the following detailed description taken together with the accompanying drawing, wherein similar reference characters refer to similar elements throughout and in which.

DESCRIPTION OF THE PREFERRED EMBODIMENTS

Figure 1:
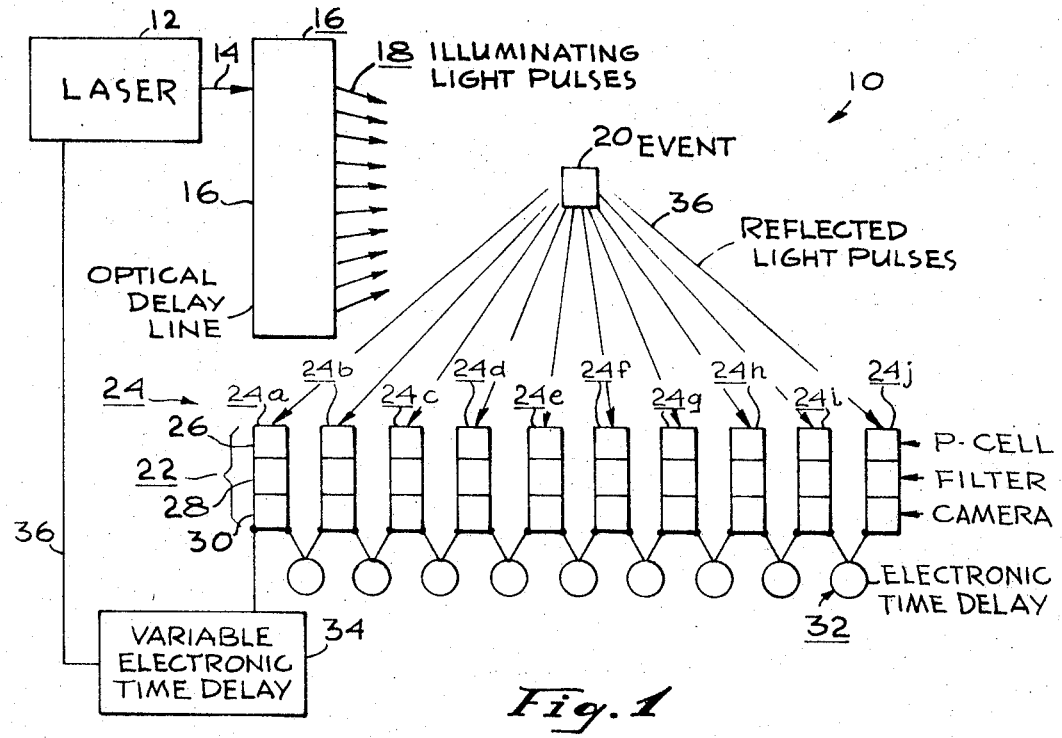
FIGURE 1 is a schematic representation of one embodiment of applicant's invention.
Figure 2:
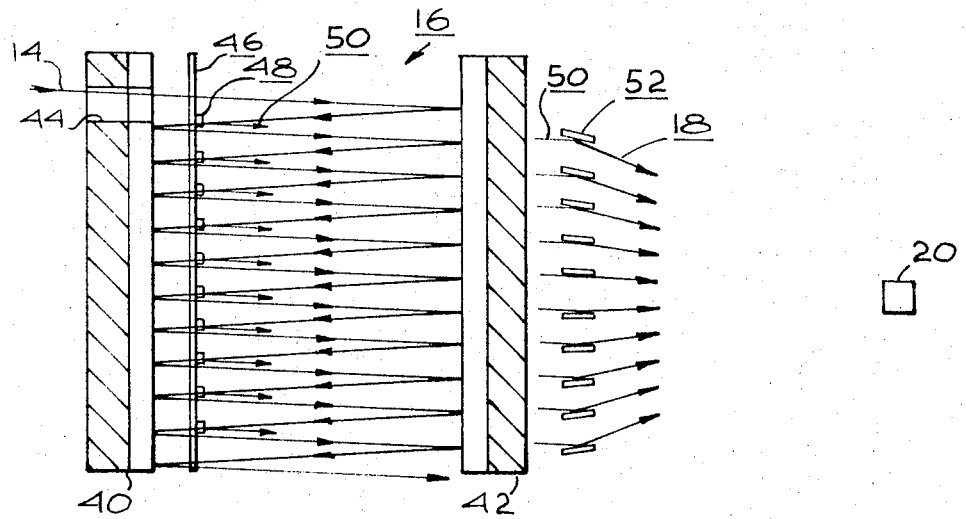
FIGURE 2 illustrates an optical delay line useful in the practice of applicant's invention herein.
Figure 3:
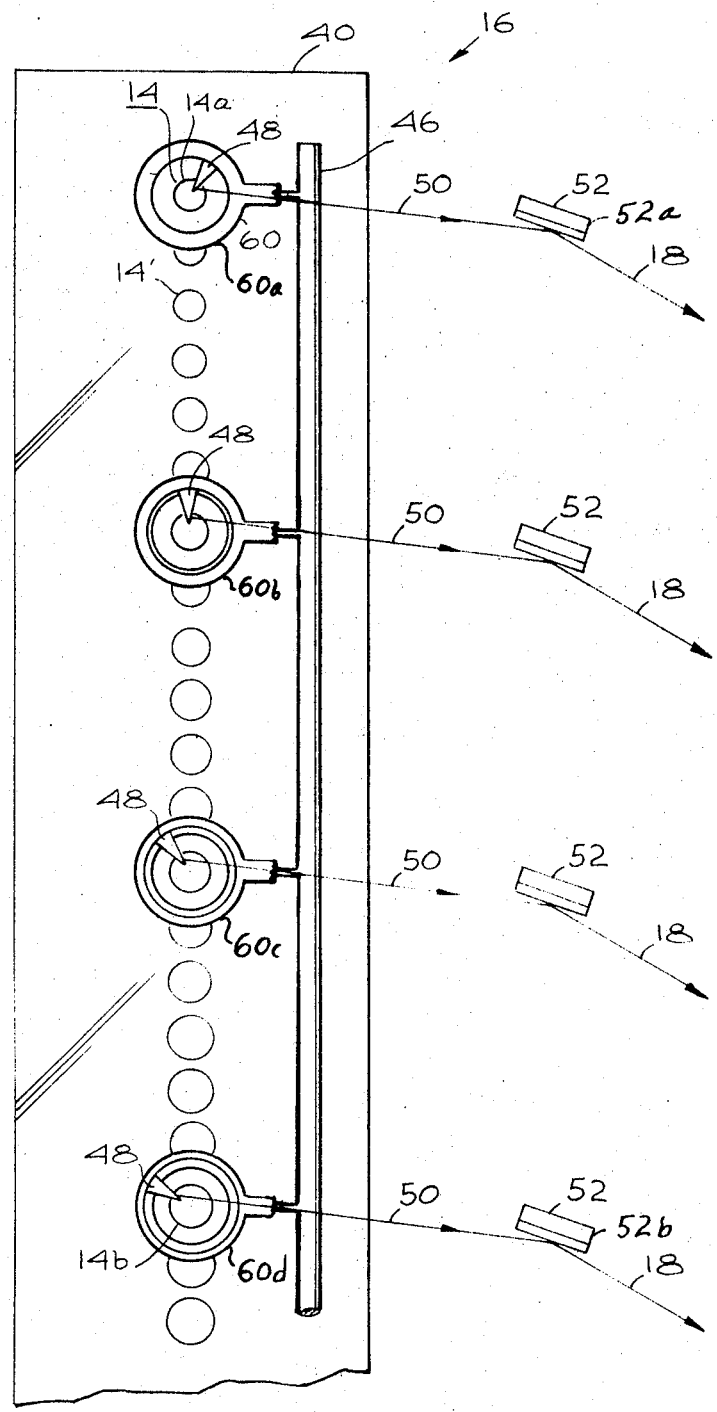
FIGURE 3 illustrates a preferred structural arrangement for the pick-off mirrors useful in the practice of applicant's invention herein.

Referring now to FIGURES 1, 2 and 3 there is shown, in generally schematic representation, the structure associated with one embodiment of applicant's invention of an improved, high-speed photographic recording arrangement generally designated 10. The high-speed photographic recording arrangement 10 is provided with a pulsed laser 12 that is adapted to emit a pulsed output indicated by the arrow 14. That is, in this embodiment of applicant's invention, the laser may be, for example, a Q spoiled ruby laser having a pulsed output on the order of 5 nanoseconds in duration. Because of the very high-speed nature of the photographic recordation of applicant's invention, the following detailed description of applicant's invention considers only a single pulse 14 from the laser 12 which, of course, may have a pulse rate of three pulses per second. All photographic events are recorded from the light emitted during such a single pulse 14 of the laser 12.

The laser pulse 14 is directed into an optical delay line 16 that provides a predetermined path length for the laser pulse, as described in greater detail below, and emits therefrom sequentially a plurality of illuminating light pulses 18. For example, the illuminating light pulses 18 may comprise ten such pulses at 50-nanosecond intervals between each of the illuminating light pulses.

The illuminating light pulses 18 are directed to shine upon an event, indicated schematically at 20, that is to be photographed throughout a period of approximately, for example, 550 nanoseconds. The illuminating light pulses 18 sequentially illuminate the event 20 so that only one of the illuminating light pulses is directed onto the event 20 at any one time.

The illuminating light pulses strike the event 20 and, for example, are reflected therefrom onto the photographic recording system structure, generally designated 22, and comprised of a plurality of ten substantially identical camera structures, designated 24. Each of the camera structures 24 are comprised of a Pockel's cell 26, a narrow pass band filter 28 that, for example, has a narrow transmission characteristic centered around the wavelength of the laser pulse 14, and a camera 30. The camera 30, of course, carries the approximate photographic plates, film or the like that is actually utilized for recording the event. It will be appreciated, of course, that the Pockel's cell 26 is utilized as a high-speed shutter for the recording structure 22. As such, other forms of high-speed shuttering arrangements, such as Kerr cells together with associated polarizing lenses, or the like, may equally well be utilized to control the exposure times. Thus, with such high-speed shutters the exposure time at each camera arrangement 24 may be controlled to be, for example, on the order of 5 nanoseconds.

Appropriate electronic time delay units 32 together with a variable time delay and pulsing unit 34, which receives a synchronizing pulse 36 from the laser 12, may be utilized to control the Pockel's cells or other form of high-speed shuttering arrangement. Thus the appropriate electronic time delay 32 and variable time delay 34 ensure synchronization between the time of omission of the appropriate laser pulse 14 and the opening and closing of the shutters by means of, for example, the Pockel's cells 26.

After the illuminating light pulses 18 illuminate the event 20, it will be appreciated that, in general, the light will generally be reflected from the event in reflected light pulses traveling from the event. The physical laws governing such reflection are, of course, well known and the receiving structures 22 may be arranged in any desired order or location around the event 20 so that appropriate pictures thereof may be obtained.

When the reflected light pulses 36 are reflected from the event 20 during the time when it is desired to photograph the event 20, each of the Pockel's cells 24 are sequentially open so that Pockel's cells 24a through 24j, inclusive, are sequentially opened for a duration of, for example, 20 nanoseconds, and at 50-nanosecond intervals between the closing of one and the opening of the next Pockel's cells. That is, the Pockel's cells 24a is initially controlled by the variable time delay 34 and is synchronized to open at an appropriate time after the laser pulse 14 is directed into the optical delay line 16. Thus, the impingement of the reflected light pulse on the Pockel's cell 24a may be considered time 0 and, therefore, the variable time delay 34 is synchronized to open the Pockel's cells 24a for a period of 20 nanoseconds at time of −10 nanoseconds and then close the Pockel's cell 24a at a time of +10 nanoseconds. A delay of approximately 50 nanoseconds may then ensue, as provided by the electronic time delay 32, and then an appropriate signal sent to the Pockel's cell 24b to open for a period of 20 nanoseconds and then close. Sequential operations governed by the electronic time delays 32 control the opening and closing of the remainder of the Pockel's cells so that after 550 nanoseconds there have been recorded the reflected light pulses in the camera 30 at 50 nanoseconds interval with 5-nanosecond exposure time.

The filter 28 is a narrow pass band filter, preferably centered around the wave length of the laser pulse 14. Applicant has found that utilization of a laser for generating light pulse for ultimate recording in the camera 30 is highly advantageous due to the highly monochromatic nature of a laser pulse. Thus, the laser pulse, for example, may have a wave length centered in the infrared region and thus is not, of course, black body radiation. However, many events, such as exploding wires, plasmas, and the like, are or very nearly are black body electromagnetic radition emitters. Further, background electromagnetic radiation particularly in the visible and near infrared and similar regions of the electromagnetic spectrum, is often black body also. Thus, the narrow pass band filters 28 centered around the laser pulse wavelength ensure that it is reflected light pulses 36 from the laser pulse 14 and illuminating light pulses 18 that are recorded on the appropriate structure in the camera 30 rather than self-illumination from the event 20 or background illumination. This provides a high degree of information content in such photographic recordings of the event 20 and tends to eliminate confusion that may be caused by background radiation and/or self-luminous events.

Further, the high power associated with comparatively narrow beams of the laser provides the high light intensity that is desired for the very short, for example 5 nanoseconds, exposure times so that actual recordings in such a short exposure time may be made. Additionally, the coherency of the laser pulse 14 provides an excellent optical delay line as described below in greater detail, that is, the diameter of the beam remaining substantially small—the optical delay line structure 16 that is useful in the practice of applicant's invention herein is illustrated in greater detail in FIGURE 2. As shown in FIGURE 2, the optical delay line structure 16 comprises a pair of spaced apart, dielectric, front surface mirrors 40 and 42. Each of the parallel dielectric front surface mirrors 40 and 42 may, for example, be on the order of 1 cm. wide by 1 meter long and spaced, for example, 1.2 meters apart. The laser pulse 14 enters the optical delay line 16 through an aperture 44 in the mirror 40 and, as shown on FIGURE 2, is at a slight angle from the perpendicular thereto. Therefore, the pulse 14 is sequentially reflected back and forth between the mirrors 40 and 42. If it is desired to photographically record the event 20 at 50-nanosecond intervals between the end of one photograph and beginning of the next, it will be appreciated that 12 traversals, or 6 two-way traverses of the 1.2 meter distance provides the necessary time delay, since the speed of light is $3 \times 10^8$ meters per second each two-way traversal of the 1.2 meters between the mirrors is a time delay of 8 nanoseconds. For convenience, as shown on FIGURE 2, only every sixth traversal is indicated. Between each two points on the mirrors 40 and 42 it will be appreciated there are 6 two-way traversals of the pulse 14 therebetween.

A support means 46 supports a plurality of pick-off mirrors 48 that are positioned to intercept a portion of each pulse and reflect the same as indicated by the arrows 50 out of the path between the two dielectric mirrors 40 and 42 and onto a plurality of focusing mirrors 52 that reflect the picked-off portions indicated by the arrows 50 to convert them into the illuminating light pulses 18 for illumination, sequentially, of the event 20.

FIGURE 3 illustrates a portion of the optical delay line 16 that applicant has found useful in the practice of his invention.

As shown on FIGURE 3, the pulse 14 is successively reflected back and forth at a small angle and as such provides imaging spots 14' along the long axis of the dielectric mirror 40. As noted above, for the particular example selected for illustration of applicant's invention herein, every sixth two-way traversal provides 48 nanoseconds delay and, consequently, the pick-off mirrors 48 are adapted to intercept the pulse 14 after each sixth such two-way traversal.

The very high coherency associated with many laser beams makes the preferred optical delay line 16 readily practical for utilization in the high speed recording arrangement 10. Since the laser pulse 14 does not increase appreciably in diameter over even comparatively extended distances, the beam diameter throughout the 60 or so two-way traverses necessary to provide, for this example, the ten photographs at 50 nanoseconds interval does not appreciably increase in size. However, in many lasers the coherency of the output is such that while the pulse beam diameter remains small, it does increase in size. This is illustrated in FIGURE 3 wherein the diameter of the beam 14 increases in size from the first reflection 14a to the last reflection 14b. If it is desired to achieve uniform intensity, the pick-off mirrors 48 may be appropriately moved inwardly and outwardly with respect to the beam 14 so that equal total powers are obtained. Consequently, the focusing mirrors 52 could be fabricated concave with sequentially smaller radia of curvature from 52a to 52b so that the energy is progressively concentrated to provide illuminating light pulses 18 with substantially constant cross sections and therefore constant intensity.

The pick-off mirrors 48 may be conveniently spaced around the spots 14' at any desired location thereof and, in general, would encompass the entire 360 degrees of arc. That is, for example, each mirror may be triangular in shape as shown and be 36 degrees in included angle at the apex thereof so that the ten of them encompass the entire beam 14 cross section. FIGURE 3, of course, only shows the first four pick-off mirrors 48 and associated structure therewith. The remainder of the structure is, of course, substantially identical thereto.

The pick-off mirrors 48 are movably mounted, in the preferred embodiment of applicant's invention, on the ring-like members 60 that are supported on the support means 46. Thus, that portion of the laser pulse beam 14 that impinges upon the mirror 48 is reflected from the beam in the direction indicated by arrow 50 to the focusing mirrors 52 which, in turn, reflect the individual portions of the beam to provide the illuminating light pulses 18 and direct them toward the event 20. By moving the pick-off mirrors 48 inwardly and outwardly, the total energy of the beams indicated by the arrow 50 may be varied since greater or lesser amounts of intersection with the beam 14 may be provided. Further, moving the mirrors around circumferentially tends to provide for uniform light intensity in the reflected beams 50.

On FIGURE 3 applicant has shown his preferred ring-like members 60a, 60b, 60c and 60d enlarged from their true size for the scale of the spots 14 in order that the supporting structure for the pick-off mirrors 48 may be more fully understood. In true size, of course, the rings 60 are free of interference with the light reflections 14.

The recording arrangements 22 are designed to open and close sequentially and, of course, the Pockel cells 26 need not be opened only for the exposure time of five nanoseconds. Rather, in the preferred embodiment of applicant's invention herein, the Pockel cells 26 are each opened for approximately 20 nanoseconds, for the example chosen, centered around the five-nanosecond exposure time. There will, of course, be a time interval between the opening of one Pockel's cell and the opening of the next successive Pockel's cell. It is apparent, of course, that the variable time delay 34 and the electronic time delay 32 provide the appropriate synchronization so that a total time allowance is made for the transit time between the emission of the laser pulse 14 and the times that the reflected light pulses 36 reach each individual recording timer arrangement 24.

Applicant prefers that the filters 28, utilized in conjunction with the recording structure 22, be comparatively narrow bandwidth transmission filters. For example, it may be on the order of two angstroms wide and centered on the laser frequency. Since the laser output is substantially monochromatic, the narrow pass band filters 28 insure that the majority of the light that is transmitted to the film or photographic plate in the cameras 30 is the reflected light beams 36 rather than background illumination or self-luminous radiation from the event 20. That is, the black body characteristic of both background and/or self-luminous event does not provide the high intensity in the very narrow band width associated with the laser operation. Therefore, discrimination is easily obtained to photograph the true position of the event 20 at different time intervals.

From the above it can be seen that in applicant's invention heretofore described there is provided a highly efficient high speed photographic recording arrangement which, in general, is free of moving parts and therefore the mechanical limitations imposed thereby. During operations applicant's invention as just described is static and provides accurate recording of events at comparatively short exposure times and comparatively high repetition rates.

Another advantage of applicant's static arrangement, as hereinabove described, is that it may comparatively easily be checked for proper alignment prior to operation. That is, by utilizing any form of light beam that may be desired, the paths of the various light beams that will appear when the laser is pulsed may be readily checked. For example, a continuous wave laser operating at comparatively low powers may be utilized to check the light paths and mirror alignments prior to utilization and thus allow any degree of desired alignment to be made in, for example, the pick-off mirrors 48, the focusing mirrors 52, or the recording arrangements 22. Also, the spacing and position of the optical delay line may equally well be checked prior to utilization.

This concludes the description of applicant's invention of an improved high speed recordation device. It will be apparent that many variations and adaptations thereof may be derived by those skilled in the art.

What is claimed is:

1. A high-speed recordation arrangement comprising, in combination:
   a source of pulsed electromagnetic radiation having a predetermined spectral content and pre-determined coherency;
   optical delay line means for receiving at least one of said pulses from said source of pulsed electromagnetic radiation and providing a preselected transmission path therefore;
   a plurality of reflecting means for sequentially receiving a predetermined portion of said at least one pulse at a plurality of positions in said transmission path and reflecting each of such said portions of said pulse sequentially;
   means for sequentially directing said portions of said pulse onto the event to be recorded; and
   a plurality of recording means for receiving the electromagnetic radiation from said portions of said pulse sequentially after reflection thereof from the event to be recorded.

2. The arrangement defined in claim 1 wherein said optical delay line means comprises:
   a pair of spaced apart parallel dielectric reflecting means for reflecting electromagnetic radiation therebetween;
   at least one of said dielectric reflecting means having an aperture therethrough for transmittal of said at least one pulse from said source of pulsed electromagnetic radiation at a predetermined angle thereto to provide a plurality of sequential reflections between each of said dielectric reflecting means.

3. The arangement defined in claim 2 wherein said reflecting means comprises:
   a support means positioned between said pair of dielectric reflecting means, and plurality of pick-off mirrors coupled to said support means and adopted to intercept a portion of said at least one pulse of electromagnetic radiation at predetermined points of the transmission path of the pulse between said pair of dielectric reflecting means and reflecting said portion of the pulse to regions external the volume defined by said pair of parallel oppositely disposed dielectric reflecting means;
   focusing mirror means for receiving each of said portions of said pulse and providing illuminating light pulses reflected therefrom onto the event to be recorded, whereby each of said illuminating light pulses is sequentially directed by the appropriate focusing mirror onto the event to be recorded.

4. The arrangement defined in claim 2 wherein said recordation means comprises:
   a plurality of camera means, each of said camera means being in a one-to-one relationship with one of said portions of said at least one pulse, and each of said camera means having a shutter control means for sequentially opening and closing to respectively allow and prevent the transmission of electromagnetic radiation transmitted through such shutter control means and filtering said electromagnetic radiation to transmit therethrough a preselected bandwidth of electromagnetic radiation; and
   said camera means further including means for photographically recording the electromagnetic radiation transmitted from said filter means into said camera means;
   and means for synchronizing the opening and closing of each of said shutter control means in response to the generation of said at least one pulse by said source of pulsed electromagnetic radiation.

5. The arrangement defined in claim 3 wherein:
   each of said pair of parallel dielectric reflecting means comprise front surfaced mirrors; and
   said shutter control means comprises a plurality of Pockel's cell means.

6. The arrangement defined in claim 5 wherein:
   each of said pick-off mirrors comprises substantially triangular shaped reflecting means supported on a ring-like member attached to said support means;
   and said pick-off mirrors individually adjustable around the periphery of said ring-like member to intercept different sectors of said pulse;
   and said pick-off mirrors are movable inwardly and outwardly with respect to the position of the pulse of electromagnetic radiation.

7. The arrangement defined in claim 6 wherein said illuminating light pulses are substantially equal in intensity.

References Cited

UNITED STATES PATENTS

| 3,116,660 | 1/1964 | Goss et al. | 352—84 |
| 3,294,002 | 12/1966 | Vitkine | 95—11.5 |
| 3,366,439 | 1/1968 | Buck et al. | 352—84 |

RICHARD B. WILKINSON, Primary Examiner.

JOSEPH W. HARTARY, Assistant Examiner.

U.S. Cl. X.R.

95—11.5; 350—299; 352—84